United States Patent [19]

Nozue et al.

[11] Patent Number: 4,691,322

[45] Date of Patent: Sep. 1, 1987

[54] GAS LASER DEVICE

[75] Inventors: Yasuhiro Nozue, Yokohama; Koichi Kajiyama; Kazuaki Sajiki, both of Hiratsuka, all of Japan

[73] Assignee: Kabushiki Kaisha Komatsu Seisakusho, Tokyo, Japan

[21] Appl. No.: 820,802

[22] Filed: Jan. 22, 1986

[30] Foreign Application Priority Data

Jan. 22, 1985 [JP] Japan .................................. 60-9629

[51] Int. Cl.⁴ ............................................ H01S 3/097
[52] U.S. Cl. ...................................... 372/82; 372/65; 372/55
[58] Field of Search ....................... 372/82, 55, 65, 61, 372/92, 81

[56] References Cited

U.S. PATENT DOCUMENTS 4,423,510 12/1983 Pack et al. ............................. 378/82
4,637,031 1/1987 Gürs et al. ............................. 372/87

Primary Examiner—Leon Scott, Jr.
Attorney, Agent, or Firm—Diller, Ramik & Wight

[57] ABSTRACT

A recess is formed on the upper surface of a cover sealing a laser chamber for accommodating plurality of capacitors for applying discharge voltage across a pair of discharge electrodes thus decreasing the cross-sectional area of a circuit loop passing discharge current. In a modified embodiment, a preliminary ionization gap is provided for a return rod constituting the circuit loop.

8 Claims, 9 Drawing Figures

GAS LASER DEVICE

BACKGROUND OF THE INVENTION

1. Field of the Invention

This invention relates to a pulse oscillation type gas laser device such as an Excimer Laser device, a transversely excited atmospheric pressure $CO_2$ laser device (TEA-$CO_2$ laser).

2. Description of the Prior Art

FIG. 9 illustrates one example of the gas laser device of this type. The laser device shown in FIG. 9 comprises a chamber 1, a pair of parallel electrodes 2 and 3 disposed in the chamber 1, and parallel plate type capacitors 4 disposed on the outside of the chamber. Terminals of each capacitor are respectively connected to the electrodes 2 and 3 via electroconductors 6, 7 and 8 mounted on the cover 5 of the chamber 1 and electroconductive rods 9 extending through the cover 5.

As capacitors are charged so that their terminal voltages rise up to discharge initiating voltage, glow discharge starts between the electrodes 2 and 3, which excites laser gas passing through a space between the electrodes 2 and 3 thus creating laser oscillation.

To improve the efficiency of discharge, it is necessary to decrease the inductance of a circuit loop extending between the terminals of each capacitor and the electrodes 2 and 3. This can be accomplished by decreasing the cross sectional area bounded by the circuit loop. This area is called a loop cross-sectional area.

In the prior art gas laser device described above, since conductors 6, 7 and 8 are mounted on the cover 5, and capacitors are mounted on and connected to the conductors, the loop cross-sectional area is large, thereby decreasing the efficiency of discharge. Moreover, as the conductors 6, 7 and 8 are mounted on the cover 5, the construction is complicate and bulky.

SUMMARY OF THE INVENTION

It is therefore an object of this invention to provide an improved gas laser device capable of decreasing the loop cross-sectional area and improving the efficiency of discharge.

Another object of this invention is to provide a gas laser device having a simple construction and can be manufactured as a compact unit.

According to this invention, there is provided a gas laser device of the type wherein an upper discharge electrode and a lower discharge electrode are disposed to confront each other beneath a cover member for sealing a laser chamber, and electric discharge of a capacitor is created between the discharge electrodes, wherein a recess is formed on the upper surface of the cover member for accommodating the capacitor.

DESCRIPTION OF THE PREFERRED EMBODIMENT

A preferred embodiment of this invention will now be described with reference to the accompanying drawings.

Figure 1:
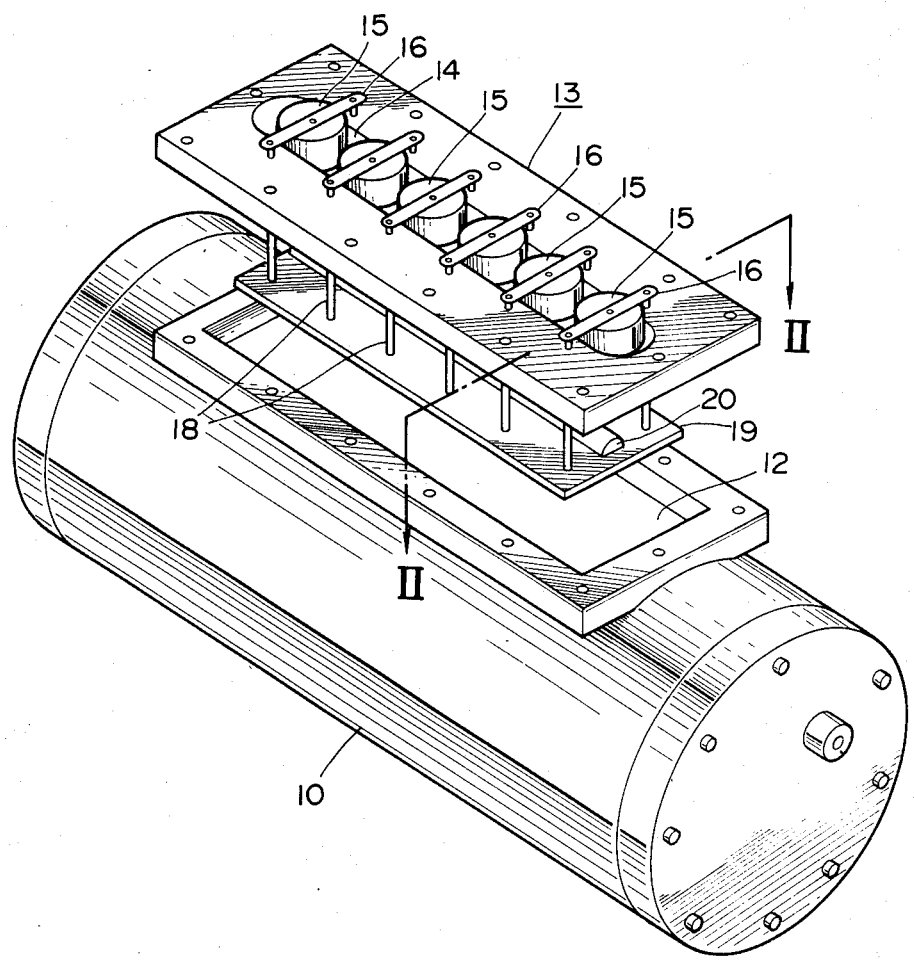
FIG. 1 is a perspective view showing one embodiment of the gas laser device according to this invention.
Figure 2:
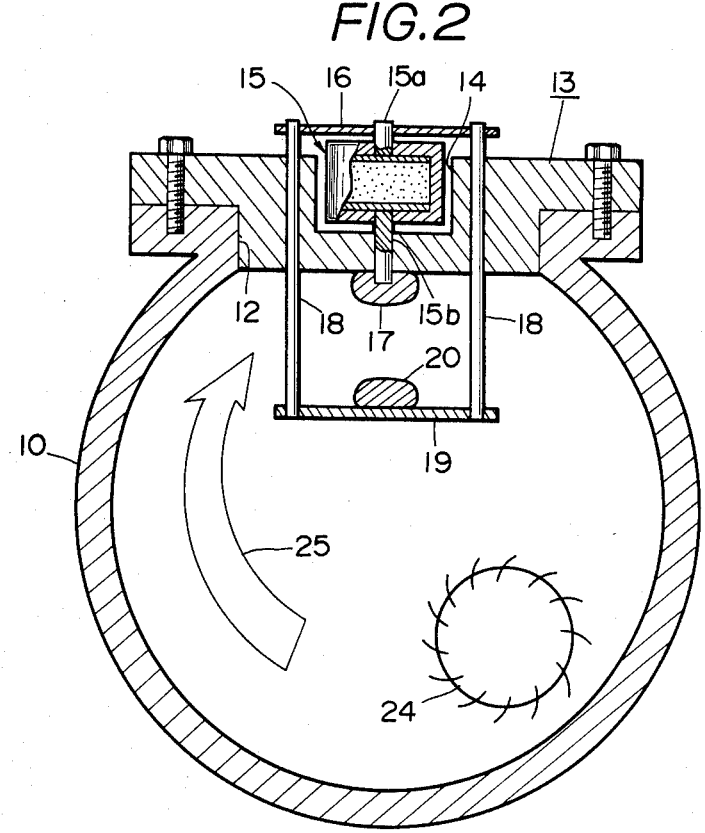
FIG. 2 is a cross-sectional view of the laser device shown in FIG. 1 taken along a line II—II.

FIG. 1 shows an Excimer laser device embodying the invention, a side opening 12 of a discharge chamber 10 thereof being closed by a cover 13 made of a synthetic resin such as teflon, epoxy or the like resin, as shown in FIG. 2.

A recess 14 is formed at the center of the upper surface of the cover 13 in the longitudinal direction thereof. A plurality of cylindrical capacitors 15 each comprising a plurality of spaced parallel plates are contained in the recess 14, with the center axes of the capacitors disposed perpendicular to the cover.

The upper terminal 15a of each capacitor is connected to the center of an electroconductive bracket 16, while the lower terminal 15b extends through the cover 13 and then connected to a upper discharge electrode 17 by means of threading or the like.

Figure 6:
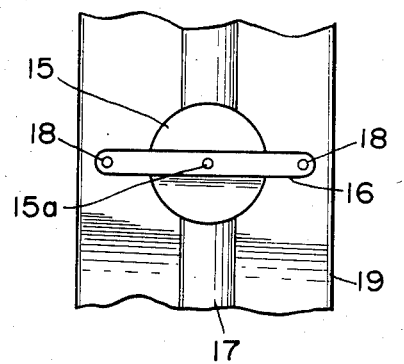
FIG. 6 is a plan view showing the arrangement of a bracket utilized in the embodiment shown in FIG. 1.

As shown in FIG. 6, the bracket 16 is perpendicular to the longitudinal axis of the discharge electrode and the opposite ends of the bracket 16 are connected to the upper ends of electroconductive return rods 18 which vertically extends through the cover 13 with their lower ends electrically connected to an electroconductive electrode supporting plate 19. At the center of the upper surface of the supporting plate 19 is mounted a lower discharge electrode 20. The upper and lower electrodes confront each other along the longitudinal axis of the cover 13.

The capacitors 15 and electrodes 17 and 20 are supported by cover 13 and the center axes of the capacitors are in coplanary with the longitudinal axes of the electrodes 17 and 20.

Figure 3:
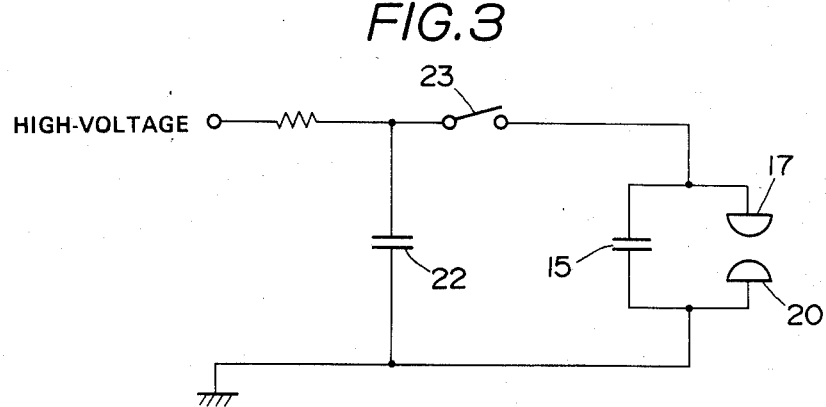
FIG. 3 shows an equivalent circuit of the embodiment shown in FIG. 1.

FIG. 3 shows an equivalent circuit of a gas laser device of this invention. The operation of the invention will be described as follows with reference to FIG. 3.

After charging a capacitor 22 with a high voltage, when a switch 23 is closed, electric charge stored in the capacitor 22 is transferred to a parallely connected capacitors 15. As the terminal voltage of the capacitors 15 rises to a discharge initiating voltage, a glow discharge starts between discharge electrodes 17 and 20, which excites laser gas 25 passing between the electrodes with the result that a laser oscillation is created between a front mirror and a back mirror, not shown, which constitute a resonator and a portion of the oscillation light thus created is outputted through the front mirror.

The laser gas 25 is circulated through the discharge chamber 10 by a blower 24 shown in FIG. 2.

Figure 4:
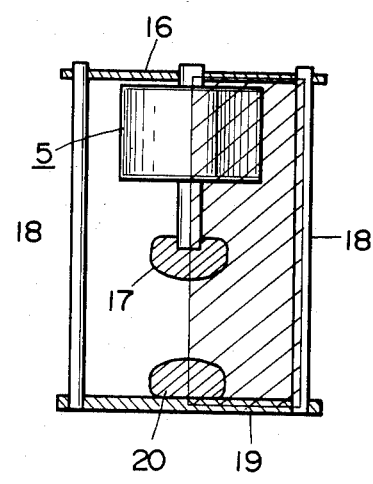
FIG. 4 shows cross-sectional area of a circuit loop through which discharge current flows.

In this embodiment, since the capacitors 15 are contained in the recess 14, the construction becomes compact. Furthermore, as it is possible to decrease the distance between the capacitors 15 and electrodes 17 and 20, it is possible to make small the loop cross-sectional area bounded by the loop through which the discharge current flows, in other words, it is possible to decrease the inductance of the circuit loop thereby to increase the efficiency of discharge. Hatched portion of FIG. 4 shows the cross-sectional area of this embodiment.

Figure 5:
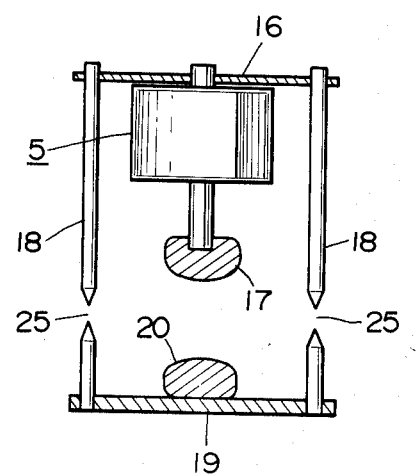
FIG. 5 shows a return rod having a gap for preliminary ionization.

As shown in FIG. 5, it is also possible to form preliminary ionizing gaps 25 at intermediate portion of return rods 18 for striking electric arcs effective to provide so-called preliminary ionization.

More particularly, electric arcs are struck across the gaps about 0.1 microsec before the main discharge occurs between the discharge electrodes 17 and 20. Ultraviolet rays, X-rays and electron rays created by the arcs irradiate the main discharge region between the discharge electrodes for preliminary ionizing the laser gas in the main discharge region. Since this preliminary ionization increases ion density in the main discharge region, the preliminary ionization decreases the discharge initialization voltage of the main discharge which follows the preliminary ionization.

Figure 7:
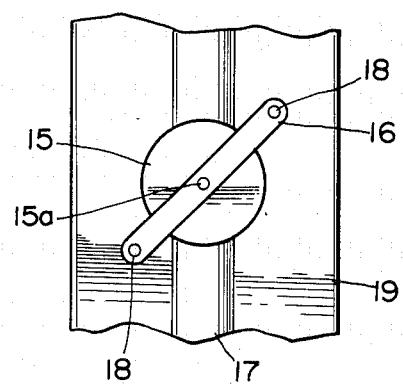
FIGS. 7 and 8 show modified arrangement of the blacket.

Although in the foregoing embodiments the bracket 16 extends perpendicularly to the axis of the discharge electrode 17, the bracket 16 can be disposed at an angle of 45° with respect to the axis of the discharge electrode 7 as shown in FIG. 7 in which case the return rods 18 are depending from both ends of the bracket. With this construction, the lower ends of the return rods 18 are positioned close to the lower discharge electrode 20, so that the loop cross-sectional area can be reduced.

Figure 8:
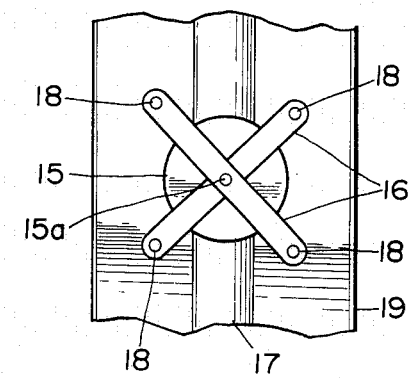
Figure 9:
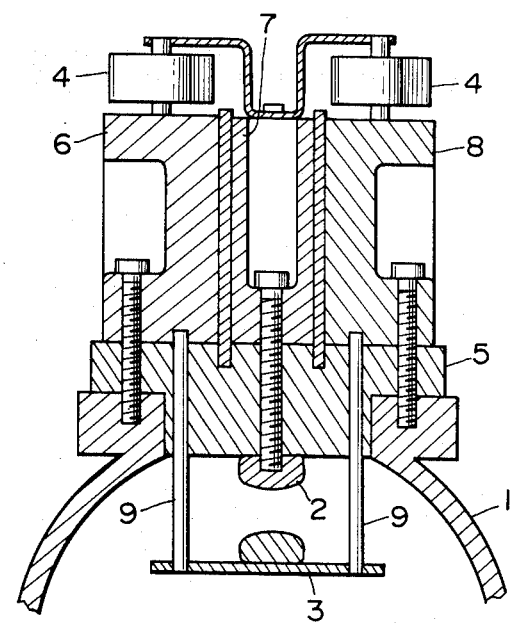
FIG. 9 is a longitudinal sectional view showing an example of a prior art gas laser device.

Furthermore, as shown in FIG. 8, where two perpendicularly crossing brackets 16 are used to increase the number of the return rods 18 and where the preliminary ionization gaps 25 are provided for the return rods, the preliminary ionization can be made uniform. It is also possible to provide two or more brackets 16 for each capacitor. It is clear that the angle between the bracket 16 and the axis of the electrode is not limited to 45°.

The invention is applicable not only to the Excimer laser device but also to other pulse oscillation type laser devices such as transversely excited atmospheric pressure laser device, $CO_2$ laser device or the like.

What is claimed is:

1. In a gas laser device of the type having an upper discharge electrode and a lower discharge electrode which is disposed to confront with said upper discharge electrode beneath a cover member for sealing a laser chamber and a plurality of capacitors arranged along the longitudinal direction of said discharge electrodes, wherein electric discharge is created between said discharge electrodes by a charged voltage of said plurality of capacitors so as to excite laser gas between said discharge electrodes, the improvement wherein a recess is formed on the upper surface of said cover member for accommodating said plurality of capacitors.

2. The gas laser device according to claim 1 wherein said capacitor is cylindrical and constituted by opposing parallel flat plates.

3. The gas laser device according to claim 2 wherein axes of said capacitors are coplanar with a plain including longitudinal axes of said discharge electrodes, and the axes of said capacitors are perpendicular to said longitudinal axes, and wherein a lower terminal of said capacitor is connected to said upper discharge electrode, whereas an upper terminal of said capacitor is connected to said lower discharge electrode via a lever projecting to both sides of said upper terminal, and return rod connected to opposite ends of said bracket and extending through said cover.

4. The gas laser device according to claim 3 wherein said bracket extends in a direction perpendicular to said longitudinal axes of said discharge electrodes.

5. The gas laser device according to claim 3 wherein said bracket is inclined to the longitudinal axes of said discharge electrodes.

6. The gas laser device according to claim 5 wherein said bracket is inclined by 45° to the longitudinal axes of said discharge electrodes.

7. The gas laser device according to claim 3 wherein a plurality of brackets are provided which make different angles with respect to the longitudinal axes of said discharge electrodes.

8. The gas laser device according to claim 3 wherein each of said return rods is formed with a preliminary ionization discharge gap at its intermediate point.

* * * * *